US012566673B2

(12) United States Patent
Egi et al.

(10) Patent No.: US 12,566,673 B2
(45) Date of Patent: Mar. 3, 2026

(54) DISTRIBUTED FAULT-TOLERANCE VIA DISAGGREGATED MEMORY BOARDS

(71) Applicant: Huawei Technologies Co., Ltd., Shenzhen (CN)

(72) Inventors: Norbert Egi, Santa Clara, CA (US); Meng Wang, Chicago, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 18/447,891

(22) Filed: Aug. 10, 2023

(65) Prior Publication Data

US 2023/0385156 A1 Nov. 30, 2023

Related U.S. Application Data

(63) Continuation of application No. PCT/US2021/018799, filed on Feb. 19, 2021.

(51) Int. Cl.
G06F 11/00 (2006.01)
G06F 11/07 (2006.01)
G06F 11/1446 (2026.01)

(52) U.S. Cl.
CPC ...... G06F 11/1451 (2013.01); G06F 11/0757 (2013.01); G06F 11/1464 (2013.01)

(58) Field of Classification Search
None
See application file for complete search history.

(56) References Cited

U.S. PATENT DOCUMENTS

| | | | |
|---|---|---|---|
| 7,779,295 B1 | 8/2010 | Shah et al. | |
| 2013/0218840 A1* | 8/2013 | Smith | G06F 16/2474 |
| | | | 707/639 |
| 2016/0147609 A1* | 5/2016 | Wallace | G06F 16/128 |
| | | | 707/647 |
| 2017/0371720 A1* | 12/2017 | Basu | G06F 9/4881 |
| 2019/0196920 A1* | 6/2019 | Andrade Costa ... | G06F 11/1471 |

(Continued)

FOREIGN PATENT DOCUMENTS

WO WO-2022177572 A1 8/2022

OTHER PUBLICATIONS

Google Scholar/Patents search—text refined (Year: 2025).*

(Continued)

*Primary Examiner* — Christopher S Mccarthy
(74) *Attorney, Agent, or Firm* — Schwegman Lundberg & Woessner, P.A.

(57) ABSTRACT

A method performed by a computing system that includes multiple compute nodes and a memory node separate from the multiple compute nodes. The method comprises executing a task using the multiple compute nodes; recurrently receiving snapshots at the memory node from the multiple compute nodes, each snapshot including an instance of a task database; setting a current checkpoint by storing a task database instance corresponding to the current checkpoint when all received snapshots match; and rolling back the task database to a previous checkpoint when detecting unmatching snapshots received from the multiple compute nodes, including the memory node distributing a correct checkpoint task database instance to at least one compute node of the multiple compute nodes.

17 Claims, 8 Drawing Sheets

(56)                    References Cited

U.S. PATENT DOCUMENTS

2020/0250044  A1      8/2020   Sharma et al.

OTHER PUBLICATIONS

"International Application Serial No. PCT/US2021/018799, International Search Report mailed Dec. 20, 2021", 5 pgs.
"International Application Serial No. PCT/US2021/018799, Written Opinion mailed Dec. 20, 2021", 8 pgs.
Xunyun, Liu, et al., "E-Storm: Replication-Based State Management in Distributed Stream Processing Systems", 2017 46th International Conference on Parallel Processing (ICPP), IEEE, (Aug. 14, 2017), 571-580.
"International Application Serial No. PCT US2021 018799, International Preliminary Report on Patentability mailed Aug. 31, 2023", 10 pages.

* cited by examiner

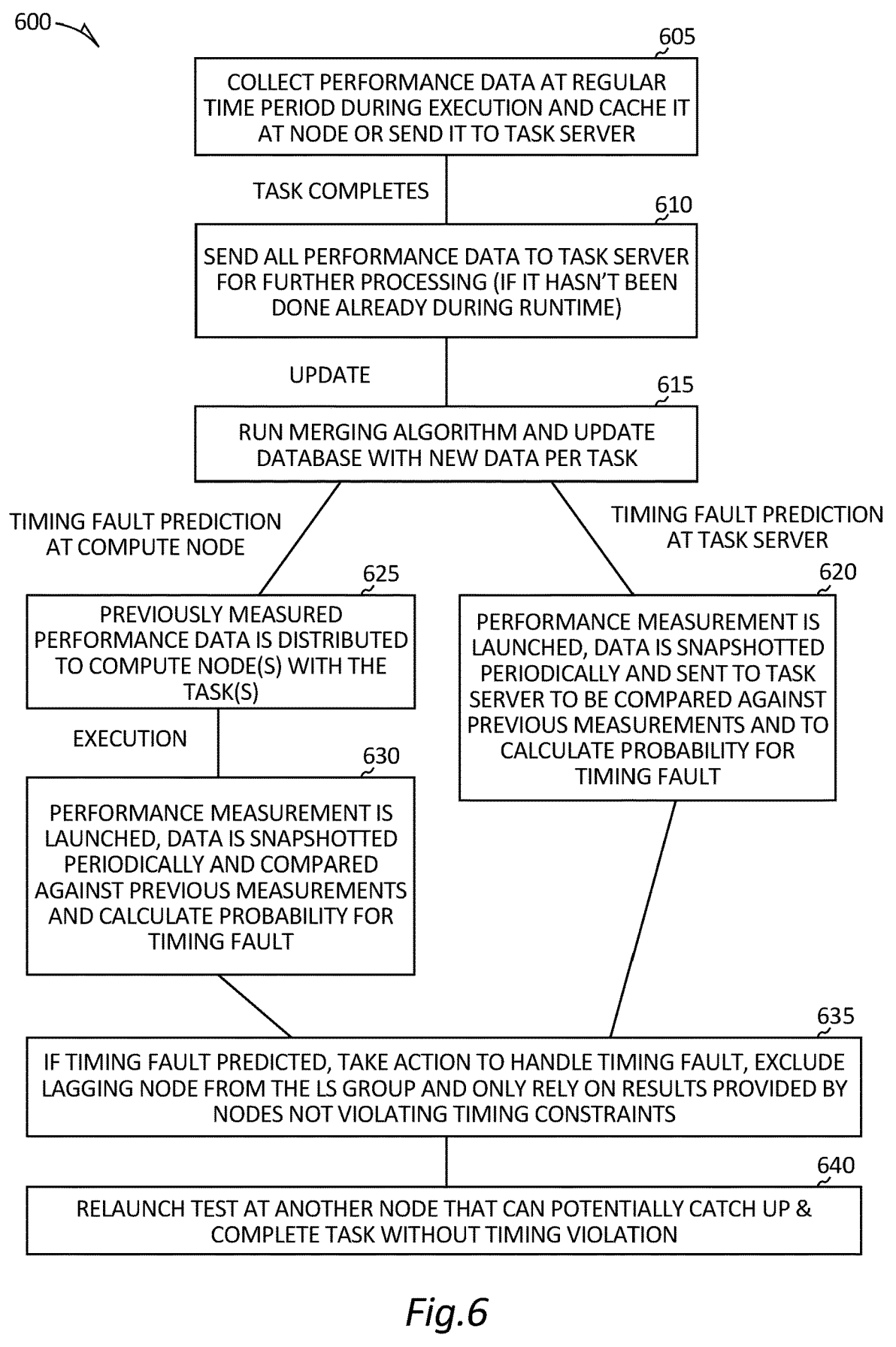

600

605

COLLECT PERFORMANCE DATA AT REGULAR TIME PERIOD DURING EXECUTION AND CACHE IT AT NODE OR SEND IT TO TASK SERVER

TASK COMPLETES

610

SEND ALL PERFORMANCE DATA TO TASK SERVER FOR FURTHER PROCESSING (IF IT HASN'T BEEN DONE ALREADY DURING RUNTIME)

UPDATE

615

RUN MERGING ALGORITHM AND UPDATE DATABASE WITH NEW DATA PER TASK

TIMING FAULT PREDICTION AT COMPUTE NODE

TIMING FAULT PREDICTION AT TASK SERVER

625

PREVIOUSLY MEASURED PERFORMANCE DATA IS DISTRIBUTED TO COMPUTE NODE(S) WITH THE TASK(S)

620

PERFORMANCE MEASUREMENT IS LAUNCHED, DATA IS SNAPSHOTTED PERIODICALLY AND SENT TO TASK SERVER TO BE COMPARED AGAINST PREVIOUS MEASUREMENTS AND TO CALCULATE PROBABILITY FOR TIMING FAULT

EXECUTION

630

PERFORMANCE MEASUREMENT IS LAUNCHED, DATA IS SNAPSHOTTED PERIODICALLY AND COMPARED AGAINST PREVIOUS MEASUREMENTS AND CALCULATE PROBABILITY FOR TIMING FAULT

635

IF TIMING FAULT PREDICTED, TAKE ACTION TO HANDLE TIMING FAULT, EXCLUDE LAGGING NODE FROM THE LS GROUP AND ONLY RELY ON RESULTS PROVIDED BY NODES NOT VIOLATING TIMING CONSTRAINTS

640

RELAUNCH TEST AT ANOTHER NODE THAT CAN POTENTIALLY CATCH UP & COMPLETE TASK WITHOUT TIMING VIOLATION

*Fig.6*

| TOTAL EXECUTION TIME | PV 1 | PV 2 | PV 3 | PV 4 | ⋮ ⋯ | PV X |
|---|---|---|---|---|---|---|
| ⋯ | ⋯ | ⋯ | ⋯ | ⋯ | ⋮ ⋯ | ⋯ |
|  |  |  |  |  | ⋮ |  |

*Fig.7*

DISTRIBUTED FAULT-TOLERANCE VIA DISAGGREGATED MEMORY BOARDS

This application is a continuation application of International Application No. PCT/US2021/018799, filed 19 Feb. 2021, the benefit of priority of which is claimed herein, and which application and publication are hereby incorporated herein by reference in their entirety.

BACKGROUND

Autonomous Things (AuT) are devices that perform specific tasks autonomously without human interaction. Due to the maturing of Artificial Intelligence (AI) and Machine Learning (ML) technologies, as well as the broad adoption of Internet of Things (IoT) technologies, AuT devices are performing more and more tasks that are considered safety-critical and/or mission-critical. These AuT devices are typically equipped with sensors, actuators, AI, and analytical capabilities to improve the functionalities they perform. To that effect, each AuT machine can make its own decision and complete tasks autonomously. As the tasks performed by AuT devices increase in complexity, fault tolerance in the devices can become challenging.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, there is provided a method performed by a distributed computing system that includes multiple compute nodes and a memory node separate from the multiple compute nodes. The method comprises executing a task using the multiple compute nodes; recurrently receiving snapshots at the memory node from the multiple compute nodes, each snapshot including an instance of a task database; setting a current checkpoint by storing a task database instance corresponding to the current checkpoint when all received snapshots match; and rolling back the task database to a previous checkpoint when detecting unmatching snapshots received from the multiple compute nodes, including the memory node distributing a correct checkpoint task database instance to at least one compute node of the multiple compute nodes.

Optionally in the preceding aspect, another implementation provides selecting, by the memory node when unmatching snapshots are detected, a correct snapshot from the unmatching snapshots and sending the correct snapshot to a compute node of the multiple compute nodes that sent an incorrect snapshot.

Optionally in any of the preceding aspects, another implementation provides selecting, by the memory node when unmatching snapshots are detected, a correct snapshot from the unmatching snapshots and sending the correct snapshot to the multiple compute nodes.

Optionally in any of the preceding aspects, another implementation provides executing the task using a combination of compute nodes of the multiple compute nodes, determining performance data for compute nodes in the combination of compute nodes, determining likelihood of a timing fault of at least one compute node in the combination of compute nodes during the task using the performance data, and changing the combination of compute nodes that are providing results for the task according to the determined likelihood.

Optionally in any of the preceding aspects, another implementation provides identifying a lagging computer node according to the determined likelihood of a timing fault and excluding results from the lagging compute node from task results.

Optionally in any of the preceding aspects another implementation provides identifying a lagging computer node according to the determined likelihood of a timing fault, and not using a snapshot received from the lagging computer node when determining whether the received snapshots match.

Optionally in any of the preceding aspects, another implementation provides identifying a lagging computer node according to the determined likelihood of a timing fault, and relaunching a task performed by the lagging computer node using a replacement compute node.

Optionally in any of the preceding aspects, another implementation provides sending the determined performance data from the combination of compute nodes to a task server of the distributed computing system and determining likelihood of the timing fault using the task server.

Optionally in any of the preceding aspects, another implementation provides sending the determined performance data from the combination of compute nodes to the memory node, determining the likelihood of the timing fault using the memory node, and sending an indication of the likelihood of a timing fault to a task server of the distributed computing system.

Optionally in any of the preceding aspects another implementation provides sending previously determined performance data to the multiple compute nodes and determining the likelihood of the timing fault using the multiple compute nodes.

According to another aspect of the present disclosure there is provided a memory device for a distributed computing system. The memory device comprises multiple task queues that store task operations performed by multiple compute nodes of the distributed computing system; memory that stores snapshots received from the multiple compute nodes, each snapshot including an instance of a task database; and a memory controller. The memory controller is in communication with the multiple task queues and the memory, and is configured to set a current checkpoint when all received snapshots match and store a task database instance corresponding to the current checkpoint; set the task database to a previous checkpoint when a mismatch in the received snapshots has been detected; and distribute a correct checkpoint task database instance to at least one compute node of the multiple compute nodes in response to detecting the mismatch in the snapshots.

Optionally in any of the preceding aspects another implementation provides a memory controller configured to select a correct snapshot from unmatching snapshots and send the correct snapshot to a compute node of the multiple compute nodes that sent an incorrect snapshot.

Optionally in any of the preceding aspects another implementation provides a memory controller configured to select a correct snapshot from unmatching snapshots and send the correct snapshot to the multiple compute nodes.

Optionally in any of the preceding aspects another implementation provides a memory controller configured to compress the received snapshots and compare compressed snapshots to detect the mismatch in the received snapshots.

Optionally in any of the preceding aspects another implementation provides a memory controller configured to receive performance data for the multiple compute nodes and send the performance data to a task server of the distributed computing system.

Optionally in any of the preceding aspects another implementation provides a memory controller configured to receive performance data for the multiple compute nodes, determine likelihood of a timing fault of at least one compute node in performing the task operations, and send an indication of the determined likelihood of the timing fault to a task server of the distributed computing system.

Optionally in any of the preceding aspects another implementation provides a memory controller configured to receive performance data for the multiple compute nodes and send previously determined performance data to the multiple compute nodes.

Optionally in any of the preceding aspects another implementation provides a cache memory configured to store snapshots received from the multiple compute nodes.

According to another aspect of the present disclosure there is provided a distributed computing system. The system comprises multiple compute nodes, a combination of the multiple compute nodes configured to execute a task and determine performance metrics related to the task; a memory node in communication with the multiple compute nodes and separate from the compute nodes, the memory node configured to receive the performance metrics from the combination of compute nodes; and a task server in communication with the multiple compute nodes and configured to change the combination of compute nodes providing results for the task according to a determined likelihood of a timing fault of at least one compute node in the combination of compute nodes during the task.

Optionally in any of the preceding aspects another implementation provides a memory node that includes a memory controller, and the memory controller is configured to determine the likelihood of the timing fault and send an indication of the likelihood of the timing fault to the task server.

Optionally in any of the preceding aspects, another implementation provides a memory node that includes a memory controller and the memory controller is configured to recurrently initiate sending the performance metrics to the task server, and the task server is configured to determine the likelihood of the timing fault.

Optionally in any of the preceding aspects, another implementation provides a memory node that includes a memory controller and the memory controller is configured to recurrently send previously determined performance metrics to the compute nodes, and each compute node of the combination of compute nodes is configured to determine the likelihood of the timing fault and send an indication of the likelihood of the timing fault to the task server.

Optionally in any of the preceding aspects, another implementation provides a memory node that includes a memory controller and the memory controller is configured to determine the likelihood of the timing fault, identify a lagging computer node according to the determined likelihood of a timing fault, and exclude results from the lagging compute node from task results.

Optionally in any of the preceding aspects, another implementation provides a task server configured to identify a lagging computer node according to the determined likelihood of a timing fault, and relaunch task subtasks performed by the lagging computer node using a replacement compute node.

BRIEF DESCRIPTION OF THE DRAWINGS

Some figures illustrating example embodiments are included with the text in the detailed description.

FIG. 6 is a flow diagram of an example of a method of data analytics performed by a distributed computing system to provide timing fault prediction for the system to implement one or more example embodiments.

FIG. 7 is an illustration representing a data structure of the performance data collected by a distributed computing system to implement one or more example embodiments.

DETAILED DESCRIPTION

Figure 1:
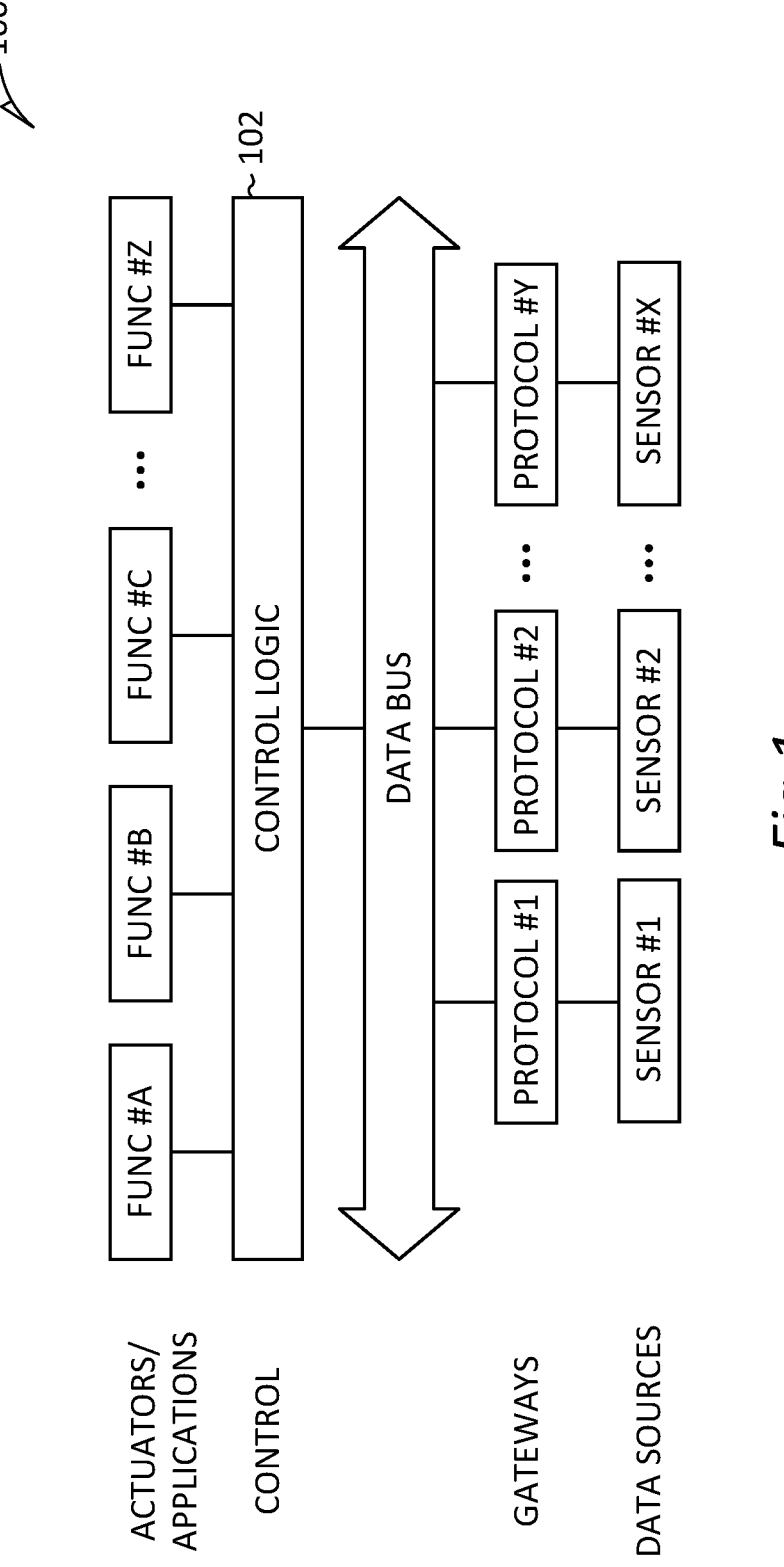
FIG. 1 is a block diagram of a centralized computing system.

In the following description, reference is made to the accompanying drawings that form a part hereof and, in which are shown, by way of illustration, specific embodiments that may be practiced. These embodiments are described in sufficient detail to enable those skilled in the art to practice the invention, and it is to be understood that other embodiments may be utilized. Structural, logical and/or electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules which may be software, hardware, firmware, or any combination thereof. Multiple functions may be performed in one or more modules as desired, and the embodiments described are merely examples. The software may be executed on a digital signal processor, application specific integrated circuit (ASIC), microprocessor, or other type of processor operating on a computing system, such as a personal computer, server or other computing system, turning such computing system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term "logic" encompasses any functionality for performing a task. For instance, each operation illustrated in the flowcharts corresponds to logic for performing that operation. An operation can be performed using software, hardware, firmware, or the like. The terms "component," "system," and the like may refer to computer-related entities, hardware, and software in execution, firmware, or combination thereof. A component may be a process running on a processor, an object, an execution, a program, a function, a subroutine, a computer, or a combination of software and hardware. The term "processor," may refer to a hardware component, such as a processing unit of a computing system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term "article of manufacture," as used herein, is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, or flash memory devices, among others. In contrast, computer-readable media (i.e., not limited to storage media) may additionally include communication media such as transmission media for wireless signals and the like.

AuT devices perform tasks autonomously and the tasks the AuT devices perform are becoming more complex and safety critical. Some examples of AuT devices include autonomous vehicles, autonomous drones, and autonomous mobile robots. There are other applications in construction, healthcare, and security. Due to the complexity of these technologies and the methods and algorithms behind them, more complex tasks can be assembled from multiple tasks of lower complexity, with each task performed using its own AI-based autonomous functionality. With the increase in complexity of the tasks performed and the increase in the number of cooperating functionalities, AuT may shift more towards hyper-automation, where a high number of independent functionalities are cooperating to complete more complex functionalities.

New developments in AuT have a significant effect on the underlying autonomous system architecture and consequently have a significant impact on fault tolerance approaches for the systems. The number and diversity of these cooperating functionalities will continue to increase, creating an even more complex environment that needs new methods to manage fault tolerance and manage compliance with stringent timing requirements between the functionalities.

FIG. 1 is a block diagram of a centralized computing system usable in AuT devices. The system 100 has centralized control logic 102 and sensors 106 that provide data to the control logic 102 through gateways using one or more protocols 107. The control logic 102 analyzes the data from sensors 106 and makes decisions to perform the functions 109 of the AuT device. However, a centralized system may not be able to adequately perform the more complex tasks needed to be performed by AuT devices.

Figure 2:
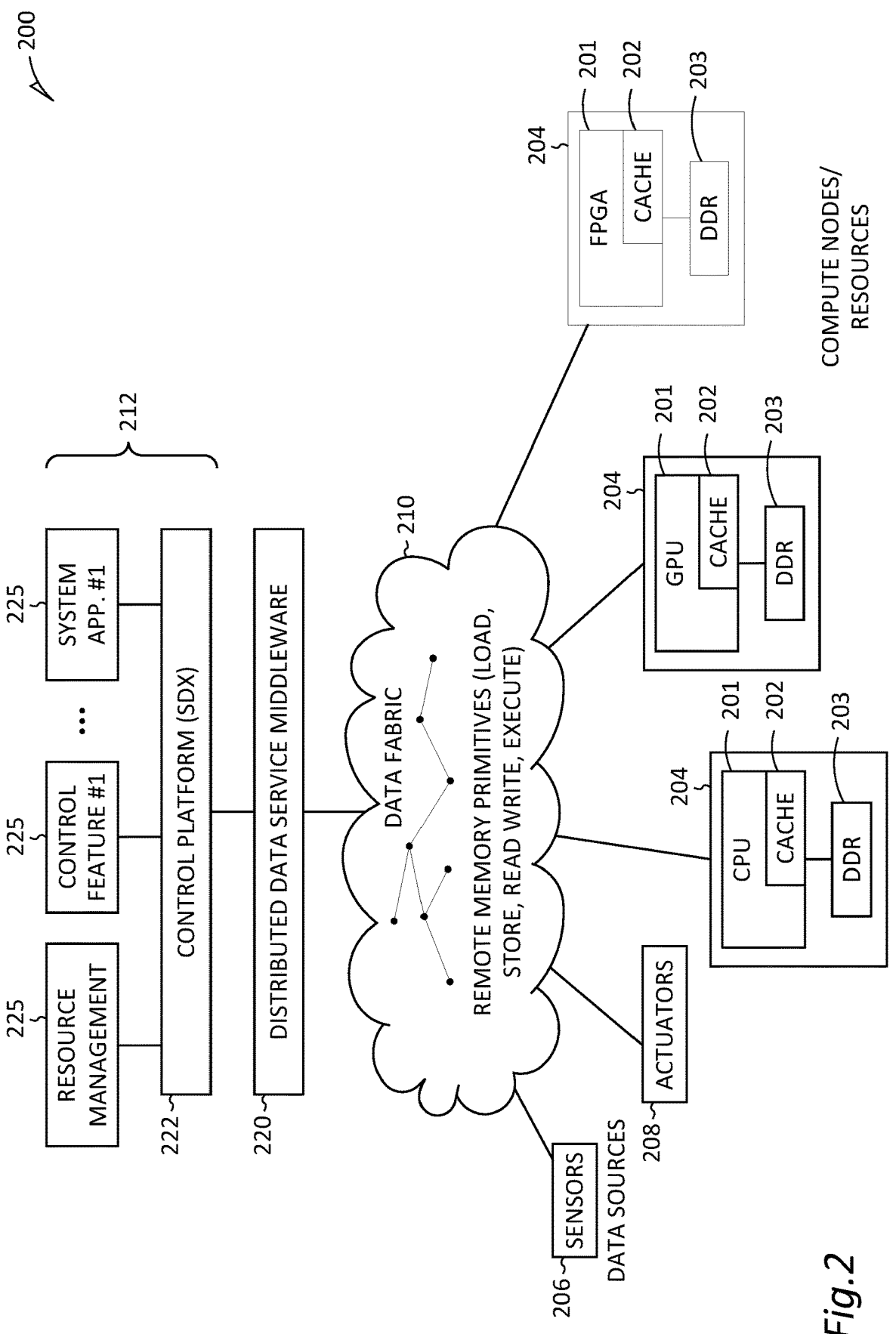
FIG. 2 is a block diagram of an example of a distributed computing system to implement one or more example embodiments.

FIG. 2 is a block diagram of a distributed computing system 200 for performing complex tasks autonomously in real time. Instead of centralized analysis and decision making, the system 200 includes multiple compute nodes 204 or compute resources. A compute node 204 includes processing circuitry 201 (e.g., a central processing unit (CPU), graphics processing unit (GPU), FPGA, etc.) and memory (e.g., cache memory 202, double data rate (DDR) memory 203, etc.) to perform tasks or subtasks assigned to the compute nodes 204. Data in the system 200 is provided by the compute nodes 204 and sensors 206 of the system 200. The compute nodes 204 may change the state of actuators 208 to interact with the environment in which the system 200 operates. The compute nodes 204, sensors 206, and actuators 208 can communicate using a data fabric 210. The compute nodes 204 may cooperate to perform a complex task with functions of the task or subtasks assigned to one or more of the compute nodes 204.

At the control level 212 of the system 200, functions or subtasks can be assigned to the compute nodes and the functions or subtasks manage computing and data resources. The system 200 can be managed and controlled through a distributed data service middleware 220, which acts like a data plane application programming interface (API) to the control platform layer 222 (e.g., software defined anything or SDX control platform layer) residing on top of the distributed data service middleware 220. The control platform layer 222 provides an interface to the different control functionalities and system applications 225 running on top of the control platform layer 222.

Fault tolerance between the functions or subtasks being performed provides for a more robust system. The conventional approach to fault tolerance is to enhance all the components of a system with fault tolerance capability. However, this approach may not be viable in a distributed computing system, such as the example system 200 of FIG. 2. An improved solution for fault tolerance would be less intrusive to the hardware design of the individual resources of the system but would still provide a sufficient level of fault-tolerance. In addition, using a hardware trusted code base rather than a software-based solution (e.g., a hypervisor or virtual machine monitor) can provide stronger isolation between tasks to improve fault tolerance.

Figure 3:
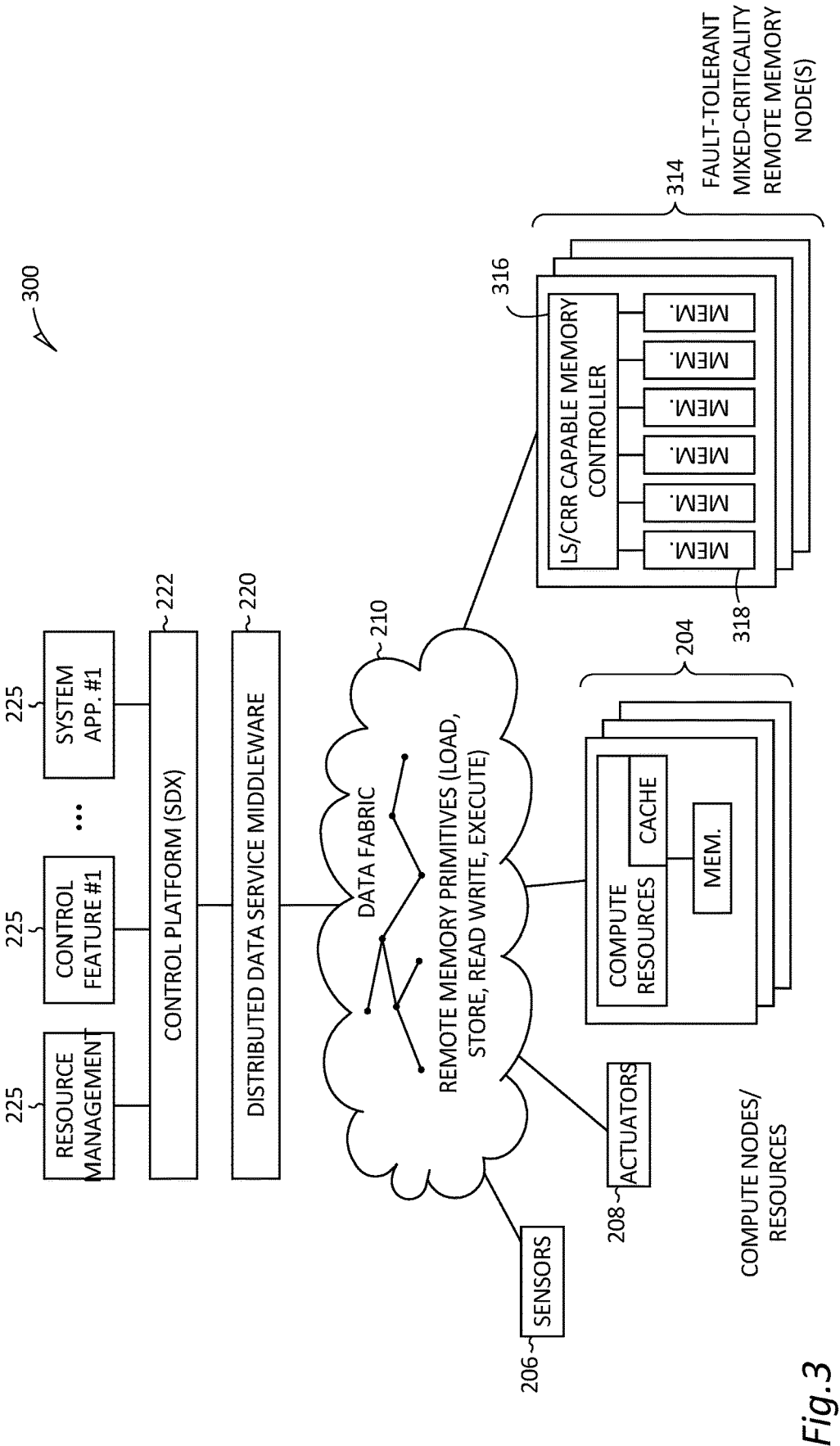
FIG. 3 is a block diagram of another example of a distributed computing system to implement one or more example embodiments.

FIG. 3 is another example of a distributed computing system 300. The system 300 includes multiple compute nodes 204, and a memory node 314 that is remote or disaggregated from the multiple compute nodes 204. The memory node 314 includes a fault tolerant memory controller 316 and may include heterogeneous memory modules 318 that each serve a separate purpose in the overall fault-tolerance framework. The system 300 shows one memory node 314, but a system may have more than one memory node 314 remote from the compute nodes 204. Having more than one remote memory node 314 can provide redundancy in the operations performed by the memory node 314 for greater fault tolerance.

The memory node 314 connects to the rest of the system 300 through a data fabric 210 that includes an interconnect (e.g., GenZ, Computer Express Link (CXL), Time Triggered Ethernet (TTEthernet), etc.). The system 300 includes distributed sensors 206 that can be the major source of data in the system 300. Actuators 208 of the system 300 perform physical or digital actions.

The memory node 314 uses hardware lockstep (LS) and checkpoint rollback recovery (CRR) to provide a multilayer, mixed-criticality fault-tolerance framework. Lock step is a distributed mechanism that ensures correct results for the task being executed. Multiple functions of the task or subtask are distributed to the multiple compute nodes 204. The subtasks execute in parallel to predetermined states or checkpoints. If an error is detected, checkpoint rollback recovery rolls back the subtasks being executed to a previous checkpoint known to be correct.

Figure 4:
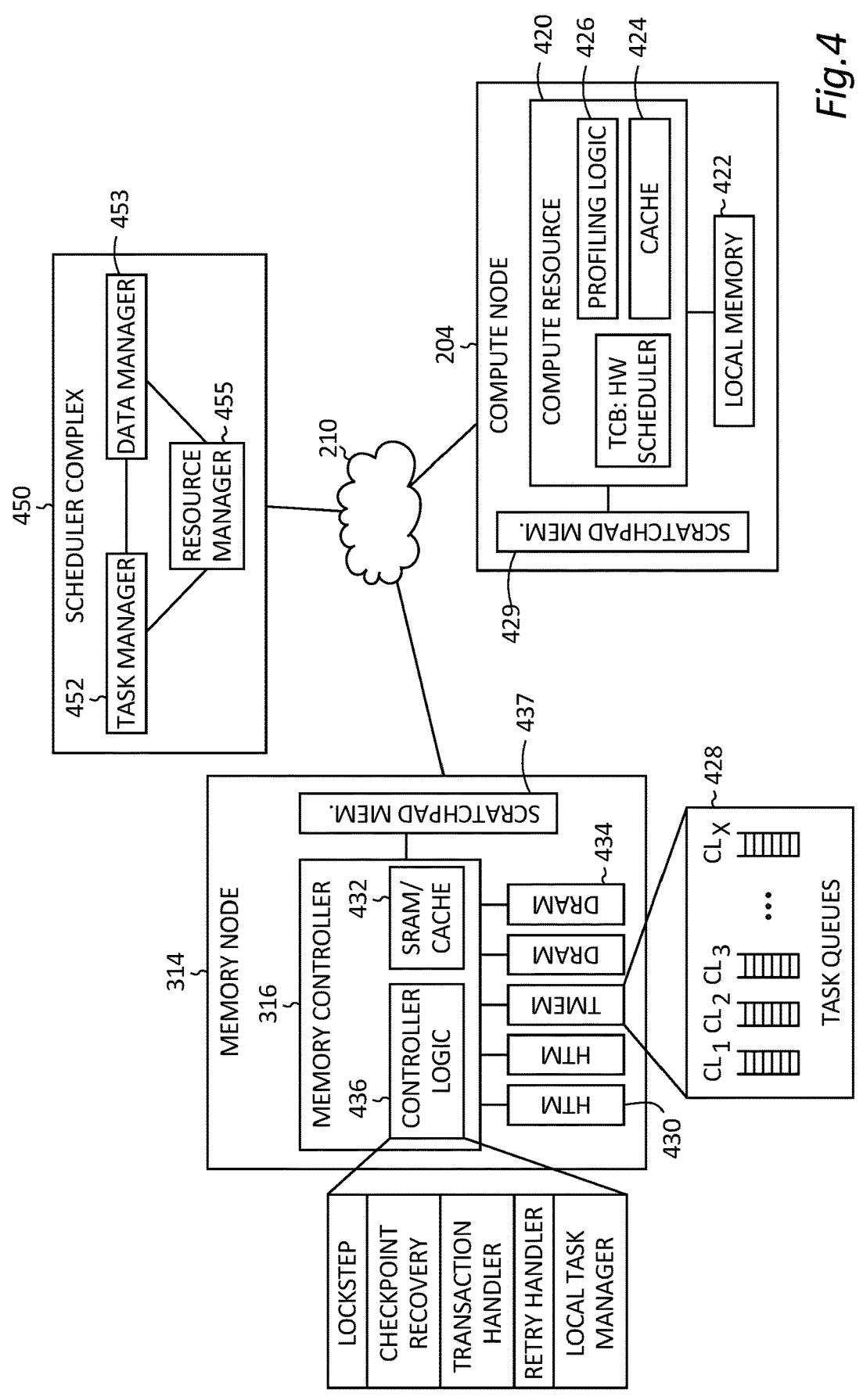
FIG. 4 is a block diagram of still another example of a distributed computing system to implement one or more example embodiments.

FIG. 4 is another example of a distributed computing system 400. The system 400 is simplified to show one compute node 204 and one memory node 314. The compute node 204 includes a compute resource 420 (e.g., a processor) a local memory 422, and a cache memory 424. The compute node 204 includes profiling logic 426 that performs execution time monitoring.

Assignment and scheduling of resources for the task may be performed by a scheduler complex 450 that resides in one or more servers. The compute nodes 204 of the system 400 connect to the memory node 314 and the scheduler complex 450 via data fabric 210. In some examples, the data fabric 210 may provide cache-coherent capability as well as perform memory primitive operations (e.g., load, store, read, write, execute, etc.) for improved performance.

The memory node 314 includes a memory controller 316, task memory (TMEM) 428 that includes task queues, and hardware transaction memory (HTM) 430. The memory node 314 may include a cache memory 432 implemented using static random access memory (SRAM) and may include dynamic random access memory (DRAM) 434. The memory controller 316 includes controller logic 436 for performing operations to improve fault tolerance of the system 400. These operations include a distributed lock step mechanism and checkpoint rollback recovery.

Figure 5:
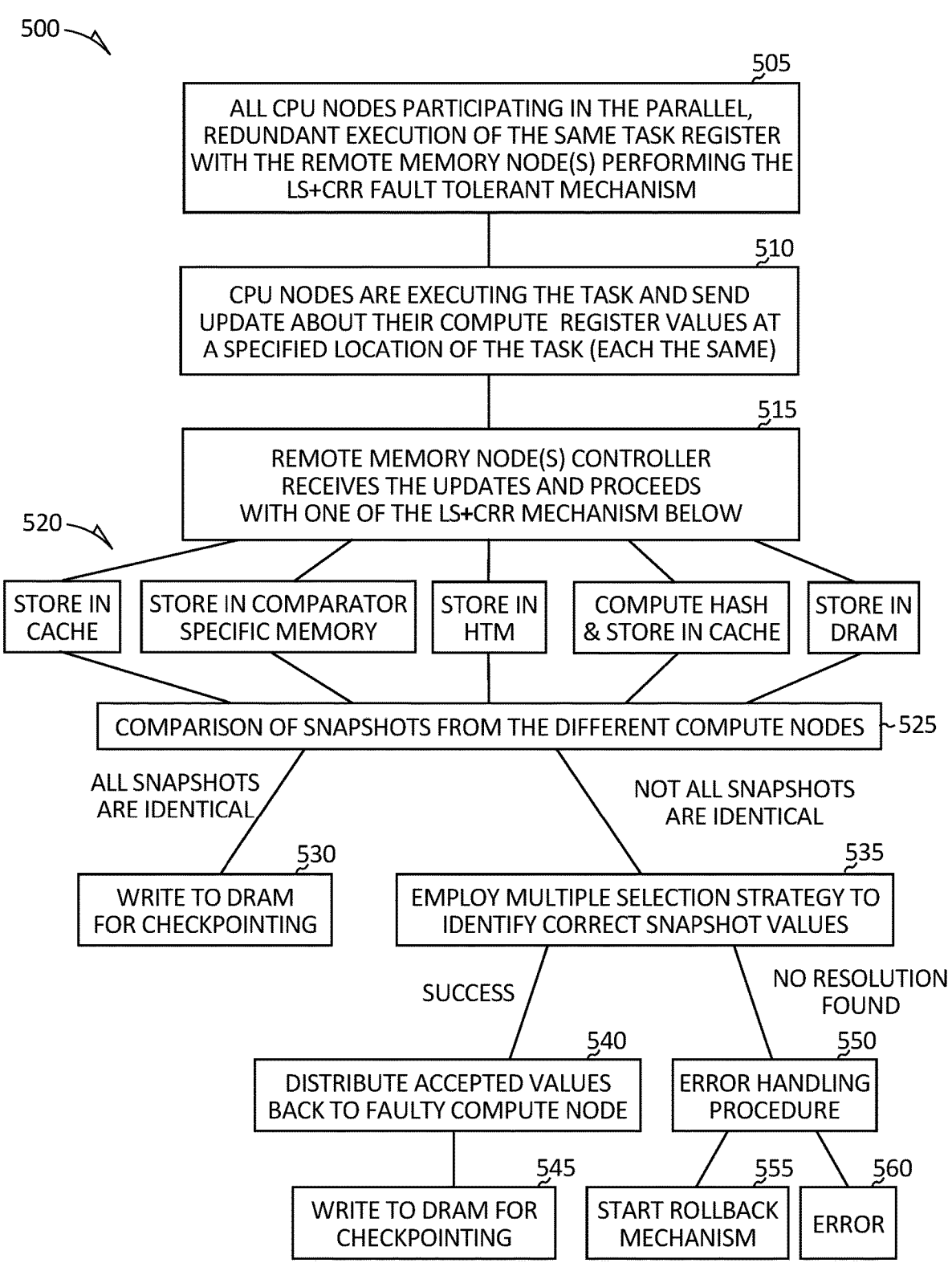
FIG. 5 is a flow diagram of an example of a method performed by a distributed computing system to provide fault tolerance for the system to implement one or more example embodiments.

FIG. 5 is a flow diagram of an example of a method 500 performed by a distributed computing system to provide fault tolerance for the system. The method 500 may be performed using the system 400 of FIG. 4, for example. In the method 500, multiple compute nodes 204 of the distributed computing system participate in performing a task in parallel. The task might be a complex task with more than one compute node performing the same task that may be a subtask of the complex task. A lock step procedure is used to make sure that the results generated by the compute nodes for the task are correct. If an error is detected, the error is corrected using checkpoint rollback recovery.

Prior to task execution, at block 505, the compute nodes 204 register with the remote memory node 314. At block 510, the compute nodes 204 that are registered to perform the task recurrently send the contents of their registers to the memory node 314. The contents of the registers of the compute nodes 204 provide a task database. This register dump from the compute nodes 204 performing the task are instances or snapshots of the task database. The task database may also include the contents of registers of sensors and actuators of the system 400.

At block 515, the memory node 314 receives the snapshot from the compute nodes 204 and proceeds to perform the lock step mechanism and (if needed) checkpoint rollback recovery. To implement the lock step mechanism, the memory node 314 stores the snapshots, which will then be compared by the memory controller 316. At block 520, the snapshots can be stored in cache memory 432, HTM 430, or DRAM 434 of the remote memory node 314. In some examples, the memory controller 316 computes a compressed hash value of the snapshots, and the compressed hash version of the snapshots are stored in cache memory 432 of the memory node 314. The compressed hash versions of the snapshots can be viewed as a form of fingerprinting of the snapshots, and the compressed hash versions of the snapshots are compared during lockstep. In some examples, the memory controller 316 stores the snapshot in comparator specific memory (not shown). Comparator specific memory may include comparator logic to compare contents of the memory and produce an indication (e.g., a signal) indicating whether the contents match.

At block 525, the stored snapshots are compared using comparison logic and checkpoints for the task are generated based on the results of the comparing. When all the snapshots match and are identical, the memory controller 316 generates a checkpoint for the task. At block 530, a snapshot is written to memory (e.g., DRAM 434) to set the current checkpoint for the task. The checkpoint is an instance of the task database at a point in the task when the results are correct because the redundant task results match.

If all of the snapshots do not match, then one or more of the compute nodes 204 produced an incorrect result and sent an incorrect snapshot. When this happens, the memory controller 316 may perform checkpoint rollback recovery for the task. At block 535, the memory controller 316 employs a selection strategy (e.g., majority voting) to identify the correct snapshot value. If the memory controller 316 is successful in identifying the correct snapshot, the compute nodes 204 that generated the correct snapshot value are allowed to continue execution. For the compute nodes 204 that didn't generate the correct snapshot value, at block 540 the selected correct snapshot is distributed to the compute node or nodes. Checkpoint rollback recovery is applied only to the compute nodes with faulty results or when a correct snapshot value cannot be identified. In variations, the selected correct snapshot is sent to all compute nodes regardless of whether the nodes produced the correct snapshot value. At block 545, the memory controller 316 generates a checkpoint of the task by writing the identified correct snapshot value to memory.

If the memory controller 316 is not successful in identifying the correct snapshot value, the memory controller 316 performs error handling at block 550. At block 555, the error handling may involve the checkpoint rollback mechanism where the memory controller 316 distributes a previously stored checkpoint (e.g., the latest checkpoint) to the compute nodes. The task is rolled back to the checkpoint and the task proceeds from the checkpoint. In this way, the task restarts from a point known to have correct results.

At block 560, the task errors out when checkpoint rollback is not possible or useful. Checkpoint rollback is not initiated, and the current task data may be abandoned. This may happen where the task is time sensitive (e.g., for an autonomous driving system or other real time system) and the checkpoint roll back would be to a time or condition that has become obsolete. Another error out condition may be where the task has errored more than once when proceeding from a previous checkpoint. When the task is completed with matching results, a new task may be assigned, or the compute nodes may repeat the same task.

The distributed computing system 400 of FIG. 4 may also predict timing faults in performing the task. To implement timing fault prediction, the compute nodes 204 that are performing the task periodically collect performance metrics while executing. This performance data may be accumulated into a performance database for the task. When the task is performed again, the performance metrics are again collected and compared to previous performance metrics. The performance data at specific points in the task is compared against previously collected performance data for that point of the task. Disparities in the performance data may be used to gauge the likelihood that a timing fault will occur during performance of the task.

FIG. 6 is a flow diagram of an example of a method 600 of data analytics performed by a distributed computing system to provide timing fault prediction for the system. At block 605, those compute nodes 204 of the system that are performing the task collect performance data at regular time periods during execution of the tasks. The performance data provides a measurement of performance of the compute node 204. Some examples of the performance data collected by a compute node 204 include the number of clock cycles when a processor of the compute node 204 was not halted, the number of instructions completed or retired by the compute node 204, the number of requests made to the level 2 cache of the compute node 204, the number of cache misses to the level 1 one cache of the compute node 204, the number of memory transactions made by the compute node 204, or the number of input-output (I/O) bus transactions made by the compute node 204.

The performance data may be collected synchronously with collecting the task results for the lockstep mechanism to collect snapshots of performance of the compute node 204. The performance data collected by a compute node 204 may be cached by the compute node 204 or sent during runtime to a task manager 452 or task server. At block 610, if the performance data was not sent to the task server during runtime, the performance data that was collected by the compute node 204 is sent to the task server for processing. The data may be sent directly by the compute nodes 204 to the task server. According to some examples, the performance data is collected by the memory node 314 and sent to the task server by the memory node 314.

At block 615, the task server updates a database of performance data with the new performance data. The task server may run a merging algorithm to update the performance data for the task. The merging algorithm may include one or both of averaging of the performance data and weighing of the performance data. For example, the most recently collected performance metrics may be weighted more than older performance metrics.

FIG. 7 is an illustration representing a data structure of the performance data collected by a distributed computing system. The data structure may be stored by the task server or may be stored by the memory node 314. The distributed computing system maintains a table for each performance data snapshot that was collected during the task's execution. Each snapshot table is a sample of the performance data at a specific time interval (e.g., 200 milliseconds or ms). As explained previously, the performance data may be sampled in synchrony with the sampling of the task results that generates task database snapshots. Each snapshot table includes a column for each type of performance value that is collected (PV 1, PV 2 . . . PV X). Some examples of the types of performance data that may be collected into the database were described previously herein. The performance values may be averaged when new performance values are received. In addition, the total execution time of the task for each run of the task is noted and is used to organize the snapshot data. In some examples, the total execution time is the primary index for a snapshot table.

New performance data is compared to the accumulated data of the data structure to detect a change in execution time and predict the likelihood of a timing fault during execution of the task. For example, the performance data may show that at a certain time in the task, one compute node 204 performing the task is falling behind relative to the performance metrics of the snapshot corresponding to that instance in time. Based on the change in performance metrics, the system may calculate the probability that a timing fault is going to occur at some point during the task.

Returning to FIG. 6, the likelihood of a timing fault can be determined by the task server, the memory node 314, or by the compute nodes 204. If the timing fault prediction is made by the task server, at block 620 the performance measurement is launched, and the task server compares new performance data to the previous measurements in the data structure to determine the likelihood (e.g., the probability) of a timing fault. If the timing fault prediction is made by the memory node 314, the compute nodes 204 may send the performance data with the lockstep task snapshots to the memory node 314. The memory controller 316 of the memory node 314 determines the likelihood of a timing fault using the performance data. In certain examples, the memory controller 316 performs a probabilistic prediction method to identify and isolate timing faults based on profiling data provided by the profiling logic 426 of the compute node 204. If the memory controller 316 determines that a timing fault is likely, the memory controller 316 may send an indication of the timing fault to the task server. The task server may then take appropriate action.

If the timing fault prediction is made by the compute nodes 204, at block 625 previous performance data is distributed to the compute nodes 204 performing the task. The performance data may be sent by the task server to the compute nodes 204 with the task. In some examples, the previous performance data is sent to the compute nodes 204 by the remote memory node 314. At block 630, the performance measurement is launched at the compute nodes 204. The compute nodes collect a snapshot of the performance data during performance of the task and compare the collected performance data against the previous performance data for the task to determine the likelihood of a timing fault. The compute node or nodes that determine that a timing fault is likely may send an indication of the timing fault to the task server.

If no timing fault is predicted, the task executes normally. If a timing fault is predicted, at block 635 the system can take action to handle the timing fault. This may involve changing the combination of compute nodes that are providing results for the task. For example, a lagging computer node 204 performing the task may be identified from the performance data. The task server may notify the memory node 314 of the lagging computer node 204 and the memory node 314 may exclude the results provided by the lagging computer node 204 from the task results recorded for the lockstep mechanism. In another example, at block 640 the task server relaunches the task using another replacement compute node 204 that was not part of the group of compute nodes 204 originally performing the task. This may be done when the task server determines that the replacement compute node can catch up and complete the task without a timing violation.

The methods, systems and devices described herein provide a solution for fault-tolerance in distributed environments that is easy to adopt without the need of changing the entire hardware environment. Adding one or more remote memory nodes to a distributed computing system allows seamless integration of the fault tolerance improvements into the distributed computing system without the need to modify the fault tolerance capability of the compute nodes of the system.

Figure 8:
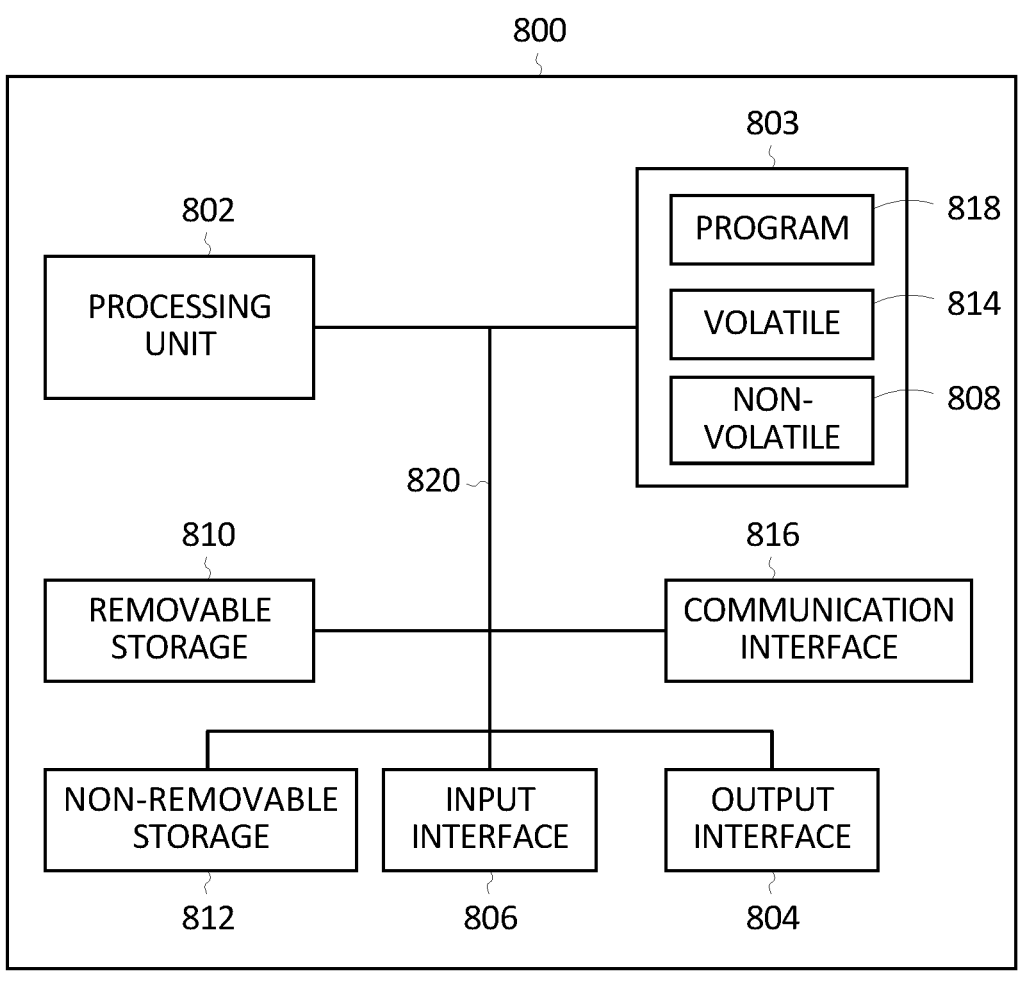
FIG. 8 is a block diagram of a computing device for performing methods and algorithms to implement one or more example embodiments.

FIG. 8 is a block diagram of a computing device 800 for performing methods and algorithms according to example embodiments. All components need not be used in various embodiments. One example is a server that may include a processing unit 802, memory 803, removable storage 810, and non-removable storage 812. Although the example computing device 800 is illustrated and described as a server, the computing device 800 may be in different forms in different embodiments. For example, the computing device may be a computer or a router.

Although the various data storage elements are illustrated as part of the computing device 800, the storage may also or alternatively include cloud-based storage accessible via a network, such as the Internet or remote server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random-access memory (RAM), read-only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computing device 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computing device 800, and other input devices. The communication interface 816 exchanges communications with external device and networks. The computer 800 may operate in a networked environment using a communication connection to connect to one or more remote computers, such as one or more remote compute nodes. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium, such as a program 818, are executable by the processing unit 802 of the computing device 800. The program 818 in some embodiments comprises software to implement one or more methods described herein. A hard drive, CD-ROM, and RAM are some examples of articles including a non-transitory computer-readable medium, such as a storage device. The terms computer-readable medium and storage device do not include carrier waves to the extent carrier waves are deemed too transitory. Storage can also include networked storage, such as a storage area network (SAN). Computer program 818 may be used to cause processing unit 802 to perform one or more methods or algorithms described herein. In some examples, the computing 800 is a task server of a distributed compute engine, and the computer program implements the functions of a task server described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method performed by a distributed computing system that includes multiple compute nodes and a memory node separate from the multiple compute nodes, the method comprising:

executing a task using a combination of compute nodes of the multiple compute nodes;

recurrently receiving snapshots at the memory node from the multiple compute nodes, each snapshot including a task database instance;

setting a current checkpoint by storing the task database instance as the current checkpoint when the received snapshots match;

rolling back the task database to a previous checkpoint when detecting unmatching snapshots received from the multiple compute nodes, the rolling back including the memory node distributing a correct checkpoint task database instance to at least one compute node of the multiple compute nodes;

determining performance data of time to complete the task for compute nodes in the combination of compute nodes;

identifying at least one lagging compute node in the combination of compute nodes during the task using the performance data;

determining likelihood of a timing fault in completing the task by the at least one lagging compute node during the task using the performance data; and changing the combination of the compute nodes that are providing results for the task according to the determined likelihood; and excluding results from the at least one lagging compute node from task results.

2. The method of claim 1, including:

selecting, by the memory node when unmatching snapshots are detected, a correct snapshot from the unmatching snapshots; and sending the correct snapshot to a compute node of the multiple compute nodes that sent an incorrect snapshot.

3. The method of claim 1, including:

selecting, by the memory node when unmatching snapshots are detected, a correct snapshot from the unmatching snapshots; and sending the correct snapshot to the multiple compute nodes.

4. The method of claim 1, including:

caching, by the combination of compute nodes, the performance data of time to complete the task; and sending the determined performance data of time to complete the task from the combination of compute nodes to the task server.

5. The method of claim 1, including:

not using a snapshot received from the at least one lagging compute node when determining whether the received snapshots match.

6. The method of claim 1, including:

relaunching a task performed by the at least one lagging compute node using a replacement compute node.

7. The method of claim 1, including:

sending the determined performance data of time to complete the task from the combination of compute nodes to a task server of the distributed computing system; and determining the likelihood of the timing fault in completing the task by the at least one lagging compute node using the task server.

8. The method of claim 1, including:

sending the determined performance data of time to complete the task from the combination of compute nodes to the memory node;

determining, by the memory node, the likelihood of the timing fault using the determined performance data; and sending an indication of the likelihood of the timing fault to a task server of the distributed computing system.

9. The method of claim 1, including:

sending previously determined performance data of time to complete the same or different task to the multiple compute nodes;

determining the likelihood of the timing fault using the multiple compute nodes; and sending an indication of a timing fault to a task server according to the determined likelihood of the timing fault.

10. A memory device of a distributed computing system, the memory device comprising:

multiple task queues that store task operations performed by multiple compute nodes of the distributed computing system;

memory that stores snapshots received from the multiple compute nodes, each snapshot including a task database instance; and a memory controller in communication with the multiple task queues and the memory, the memory controller configured to:

set a current checkpoint when the received snapshots match and store a task database instance corresponding to the current checkpoint;

set the task database to a previous checkpoint when a mismatch in the received snapshots has been detected;

distribute a correct checkpoint task database instance to at least one compute node of the multiple compute nodes in response to detecting the mismatch in the snapshots;

receive performance data of time to complete the task for the multiple compute nodes;

identify at least one lagging compute node of the multiple compute nodes during the task using the performance data;

not use a snapshot received from the at least one lagging compute node when determining whether the received snapshots match;

determine likelihood of a timing fault of at the least one lagging compute node in performing the task operations; and send an indication of the determined likelihood of the timing fault to a task server of the distributed computing system; and wherein the task server changes the combination of the compute nodes that are providing results for the task according to the determined likelihood.

11. The memory device of claim 10, wherein the memory controller is configured to:

select a correct snapshot from unmatching snapshots; and send the correct snapshot to a compute node of the multiple compute nodes that sent an incorrect snapshot.

12. The memory device of claim 10, wherein the memory controller is configured to:

select a correct snapshot from unmatching snapshots; and send the correct snapshot to the multiple compute nodes.

13. The memory device of claim 10, wherein the memory controller is configured to:

compress the received snapshots; and compare compressed snapshots to detect the mismatch in the received snapshots.

14. The memory device of claim 10, wherein the memory is a cache memory that stores the snapshots received from the multiple computer nodes.

15. A distributed computing system, the distributed computing system comprising:

multiple compute nodes, a combination of the multiple compute nodes configured to execute a task and determine performance metrics related to the task;

a memory node in communication with the multiple compute nodes and separate from the compute nodes, the memory node configured to receive the performance metrics from the combination of compute nodes;

a task server in communication with the multiple compute nodes and configured to:

determine performance data of time to complete the task for compute nodes in the combination of compute nodes;

identify at least one lagging compute node in the combination of compute nodes during the task using the performance data;

determine likelihood of a timing fault in completing the task by the at least one lagging compute node during the task using the performance data;

change the combination of compute nodes providing results for the task according to the determined likelihood of a timing fault of at the least one compute node in the combination of compute nodes during the task; and exclude results from the at least one lagging compute node from task results.

16. The system of claim 15, wherein the memory node includes a memory controller, and the memory controller is configured to determine the likelihood of the timing fault using the performance data of time to complete the task and send an indication of the likelihood of the timing fault to the task server.

17. The system of claim 15, wherein the memory node is configured to recurrently receive snapshots from the multiple compute nodes, each snapshot including a task database instance;

wherein the task server is configured to:

set a current checkpoint by storing the task database instance as the current checkpoint when the received snapshots match, including not using a snapshot received from the at least one lagging compute node when determining whether the received snapshots match; and roll back the task database to a previous checkpoint when detecting unmatching snapshots received from the multiple compute nodes, including distributing a correct checkpoint task database instance to at least one compute node of the multiple compute nodes.

* * * * *